United States Patent [19]

Cunningham

[11] E Re. 28,625

[45] Reissued Nov. 25, 1975

[54] ROCK DRILL WITH INCREASED BEARING LIFE

[75] Inventor: Robert A. Cunningham, Bellaire, Tex.

[73] Assignee: Hughes Tool Company, Houston, Tex.

[22] Filed: Nov. 29, 1974

[21] Appl. No.: 528,376

Related U.S. Patent Documents

Reissue of:

[64] Patent No.: 3,620,580
Issued: Nov. 16, 1971
Appl. No.: 60,372
Filed: Aug. 3, 1970

[52] U.S. Cl. ..... 308/8.2; 308/35
[51] Int. Cl.[2] ..... F16C 19/14; F16C 21/50
[58] Field of Search ..... 308/8.2, 35; 175/337, 348, 175/370

[56] References Cited

UNITED STATES PATENTS

| | | | |
|---|---|---|---|
| 2,025,259 | 12/1935 | Zublin | 175/337 |
| 2,025,261 | 12/1935 | Zublin | 175/337 |
| 3,549,214 | 12/1970 | Neilson | 308/8.2 |

*Primary Examiner*—M. Henson Wood, Jr.
*Assistant Examiner*—Gene A. Church
*Attorney, Agent, or Firm*—Robert A. Felsman

[57] ABSTRACT

The invention is applicable to all types of rock drills in which a rolling cutter is rotatably mounted on a fixed shaft member with an interposed ball bearing, and is especially useful in the newer rock bits provided with a lubricant system and a highly effective seal. Heretofore the ball bearing has served as a means for transmitting loads from cutter to shaft, including both radial loads and axial loads. The inventor has modified the bearing structure in such a way that at least outward thrust loads and preferably radial loads as well no longer pass through the balls, i.e., from the raceway of the cone through the balls to the corresponding raceway on the bearing pin. This is accomplished by relieving or deepening either or both raceways, preferably in a nonuniform fashion so that the deepest relief is in the outboard portion of the bearing pin raceway or the inboard portion of the cone raceway, or both. One or more pairs of transversely extending friction bearing surfaces are disposed on the pair of members to absorb such thrust.

The important effect of this improvement is reduction or elimination of spalling of the ball raceways, thus eliminating metal particles that otherwise could find their way between the confronting surfaces of other bearing members, where they are likely to wreck havoc. The overall effect is to increase the life of the bearing, making it last as long as the cutting structure of the bit.

15 Claims, 11 Drawing Figures

ROBERT A. CUNNINGHAM
INVENTOR

BY Roy H. Smith, Jr.
ATTORNEY

ROBERT A. CUNNINGHAM

*INVENTOR.*

BY Roy V. Smith, Jr.

ATTORNEY

ROBERT A. CUNNINGHAM
*INVENTOR*

BY Roy V. Smith, Jr.
ATTORNEY

ROCK DRILL WITH INCREASED BEARING LIFE

Matter enclosed in heavy brackets [ ] appears in the original patent but forms no part of this reissue specification; matter printed in italics indicates the additions made by reissue.

ROCK DRILL WITH INCREASED BEARING LIFE

The present invention is an improvement in rolling cutter drilling tools such as rock bits, hole reamers and shaft cutters. More specifically, the invention is an improvement in those bearing structures of such drilling tools which include a ball bearing, i.e., a row of balls disposed in a pair of registering circumferential raceways, one in the bearing cavity of the rolling cutter, and the other in the shaft or bearing pin on which the rolling cutter rotates. It is applicable to both older bearing structures using a combination of friction and nonfriction elements, and to newer bearing structures using a journal in place of the older roller bearing. It also applies to both unsealed cutter assemblies and effectively sealed cutters, being particularly useful with the latter.

Until the advent of the present invention, the ball bearing of a rolling cutter assembly has served a dual purpose. It has locked the cutter on its bearing pin. At the same time, it has served as a load absorbing member for both radial loads and the outward thrust which tends to force the cutter against the bearing pin. Such loading is more than the ball bearing can support for the life of the cutting structure.

Such bearings fail in fatigue, by spalling of the race on the bearing pin. Small pieces of metal are loosened from this raceway and find their way between other parts of the bearing, where they cause additional damage by being ground into roller raceways or into confronting surfaces of friction bearings. The net effect of such spalling is to reduce the otherwise possible long life of the composite bearing, causing the rolling cutter assembly to be retired well before its cutting structure is completely dulled.

The general object of the present invention is to provide longer lived bearings in rolling cutter assemblies of rock drills.

Another object is to increase the bearing life of rock drilling tools which include a ball bearing by so modifying such bearing as to increase the operational life of the ball bearing.

Another object is to provide such a ball bearing improved to prevent spalling of the ball raceways.

Another object is to provide, in a lubricated and effectively sealed rolling cutter assembly, a composite bearing in which the only nonfriction component is a ball bearing used to lock the rolling cutter on its bearing pin and in which the parts of such ball bearing are as long lived as the friction bearing components of the composite bearing.

The above and other objects are attained according to the present invention by putting less demand on the ball bearing, reducing the number of functions it is required to accomplish. Specifically, the ball bearing is relieved of the task of carrying outwardly directed axial thrust loads, and preferably radial loads as well, this function being taken over by other parts of the bearing. Structurally, this is accomplished by deepening or "prewearing" portions of one or both of the ball raceways, those portions which have previously been contacted by the balls when operation of the assembly exerts one or both radial and outward thrust loads on the rolling cutter. When relief from only an outward thrust load is desired, such portions may be limited to either or both the outward half of the bearing pin raceway and the inward half of the rolling cutter raceway, but for relief from radial loading as well one or both raceways are also undercut in the radial direction. Such deepening or undercutting provides a total raceway space having a dimension in the direction of the load to be eliminated which exceeds the diameter of the balls, even after considerable wear.

Axial movement of the cutter and its ball raceway relative to the ball raceway of the bearing pin is controlled by thrust bearing members in the form of transversely extending pairs of friction surfaces, such surfaces being designed to contact one another when the bit is new and being made of materials that do not wear sufficiently to allow the ball to contact the undercut portions of its raceways until the cutting structure of the assembly is completely dulled.

The invention will undoubtedly be clearer to the reader from an examination of the enclosed drawing, considered together with the following detailed description. In the drawing:

FIGS. 1 through 9 are longitudinal sections through a single rolling cutter mounted on one of the depending bearing pins of a rock bit, the orientation being such that the long edges of the paper are parallel to the vertical axis of a rock bit as it is disposed in a borehole drilled by the bit. Of these illustrations, FIGS. 1 and 4 are complete sections while the others are enlargements of the portions of the composite bearing which show the ball bearing and the annular thrust face. It is to be understood that these figures are limited to a rolling cutter assembly of a rock bit for illustrative purposes only, and that similar illustrations of rolling cutter assemblies used in borehole reamers, shaft cutters, etc., could be added to illustrate the invention as claimed at the end hereof.

FIG. 2 depicts the rolling cutter assembly of FIG. 1 after a period of service has partially worn the bearing. In addition, the posture of the rolling cone cutter relative to the bearing pin is that in which the net axial force acting on the cutter is outward, the cutter being thrust as tightly as possible onto the bearing pin.

FIG. 3 is identical with FIG. 2 except for the posture of the cone relative to the bearing pin. In FIG. 3, the net axial force on the rolling cone cutter is inward, tending to push the cone off of the bearing pin.

Figure 1:
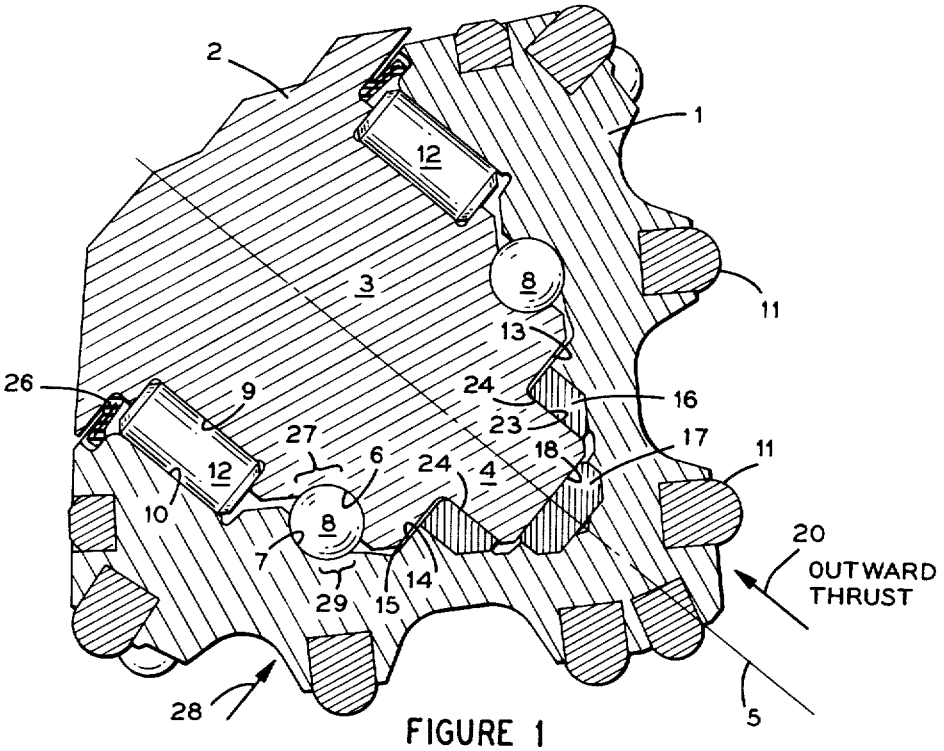
FIGURE 1 PRIOR ART
FIGS. 1–3 illustrate the prior art, FIG. 1 showing a lubricated and sealed cutter assembly using the traditional balls and rollers plus the friction-type nose bearing which is also characteristic of the prior art. The assembly of this figure is newly manufactured, showing the condition of all parts prior to any service.
Figure 2:
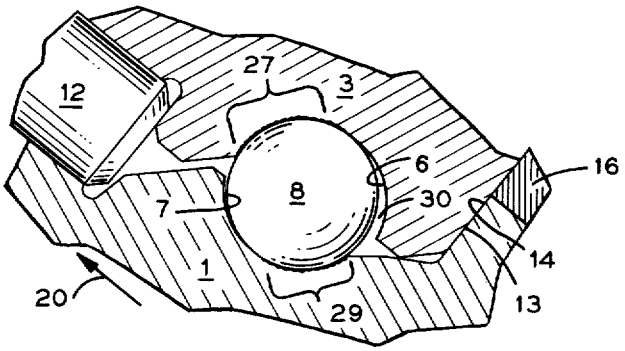
FIGURE 2 PRIOR ART
Figure 3:
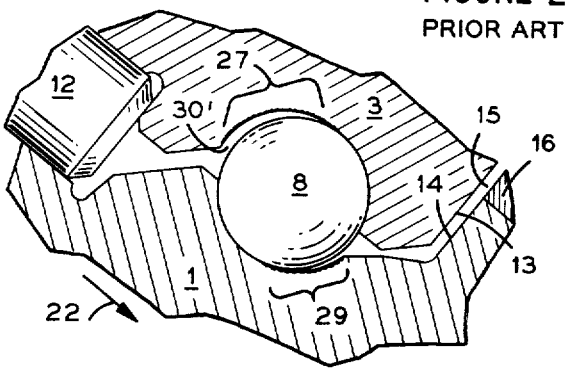
FIGURE 3 PRIOR ART
Figure 4:
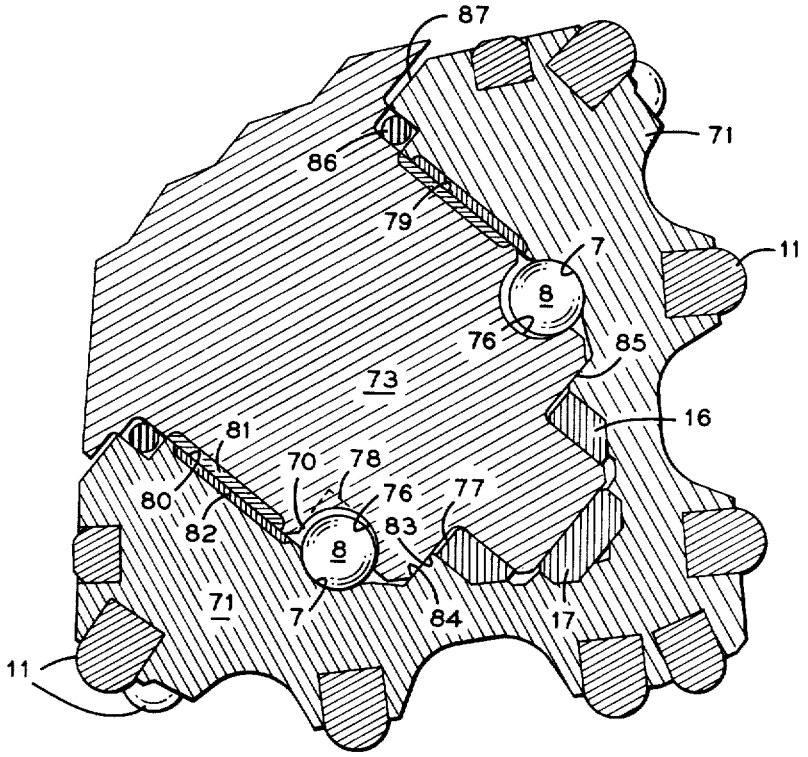
Figure 5:
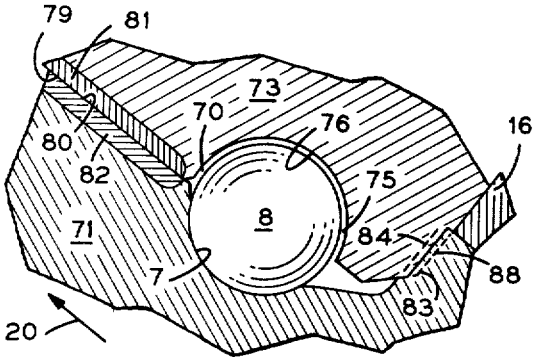
Figure 6:
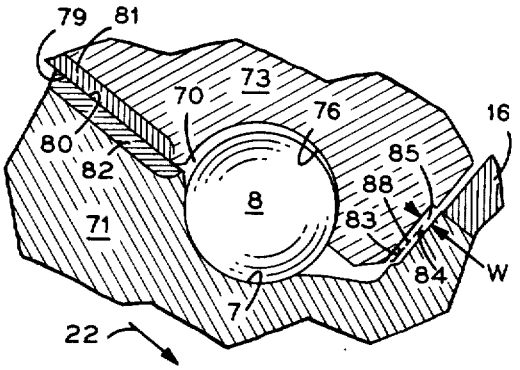

FIGS. 4, 5 and 6 are respectively similar to FIGS. 1, 2 and 3, but show the improvements of the present invention applied to a slightly different rolling cone cutter assembly. In FIGS. 4–6 the rollers of FIGS. 1–3 have been replaced with a journal bearing, and an annular, resilient packing ring is included at the back face of the cone to prevent the entry of contaminants and to prevent the leakage of lubricant. A complete lubrication system (not shown) is included. FIG. 4 shows the new rolling cutter assembly prior to any wear, FIG. 5 shows the same assembly after some wear and with the cone in the outward thrust position, while FIG. 6 shows the same assembly and the same wear condition but with the cone thrust inwardly, in the direction tending to push the cone from the bearing pin.

Figure 7:
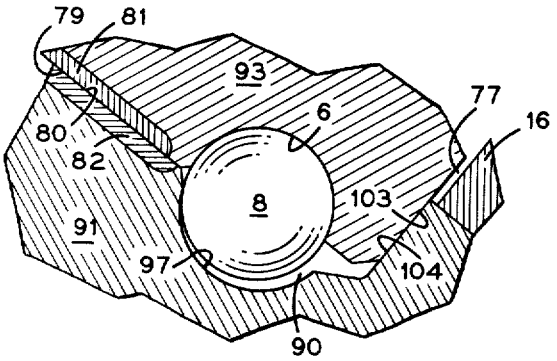

FIG. 7 shows a modified embodiment of the invention in which the ball race relief is limited to the rolling cutter, this fragmentary section showing a newly manufactured assembly.

Figure 8:
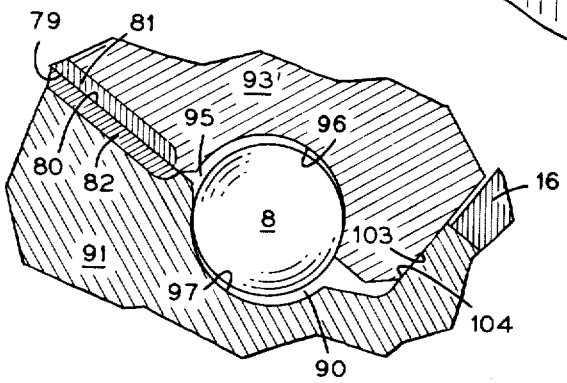

FIG. 8 illustrates a new bit assembly of a third embodiment, one which includes undercutting of both ball races.

Figure 9:
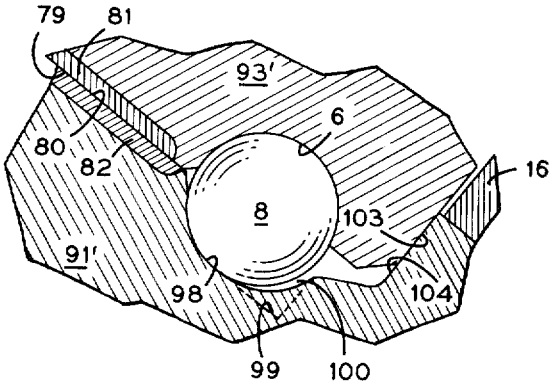

FIG. 9 also illustrates a new bit assembly, this fragmentary section showing an embodiment (fourth) in which the ball race is undercut to relieve against only outward thrust and illustrating other forms of undercutting.

Figure 10:
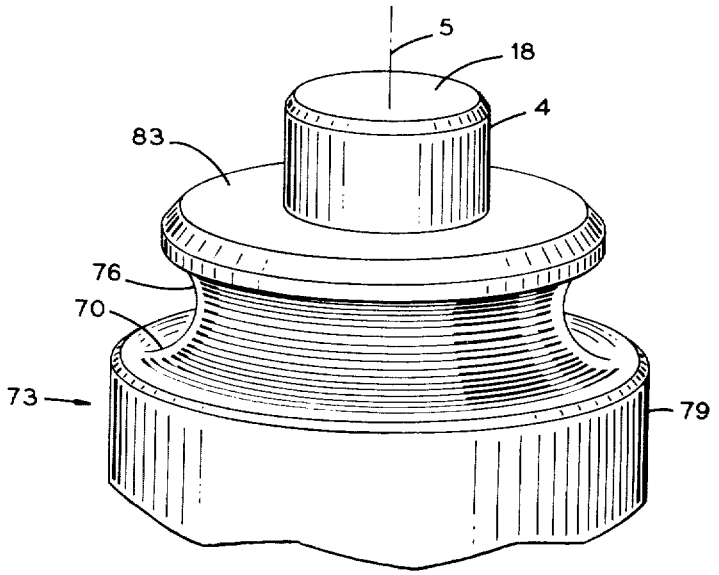

FIG. 10 is an isometric view of a bearing pin similar to that shown in FIGS. 4–6 after a considerable period of service, showing the lack of raceway spalling resulting from the improvement produced by the present invention.

Figure 11:
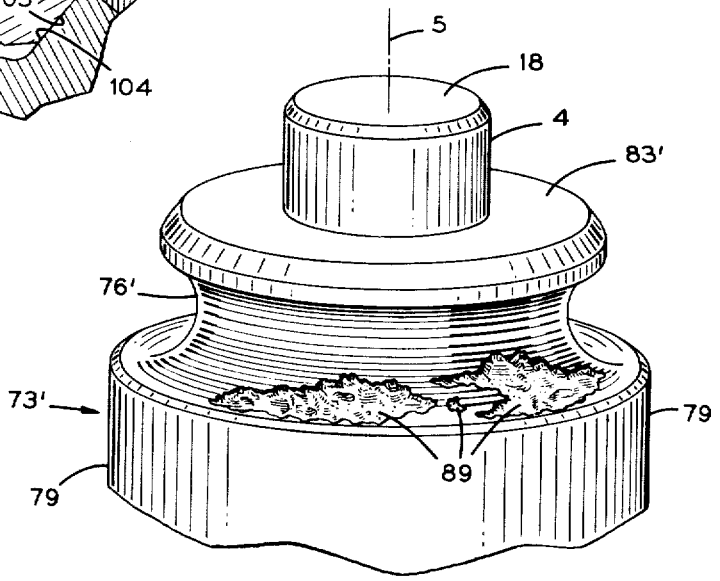
FIGURE 11 PRIOR ART

FIG. 11 is an isometric view of a prior art bearing pin similar to that of FIG. 10, after a comparable period of service. It shows the results produced by using a ball bearing lacking the improvement of the present invention. The badly spalled condition of the bit in FIG. 11 is apparent, and a comparison of this figure with FIG. 10 will make obvious to the reader the improved results obtained with the present invention.

The prior art rolling cone cutter assembly shown in FIG. 1 includes a bit leg 2 depending from the body of the bit (not shown,) and a stub shaft or bearing pin 3 integral with leg 2 and generally normal thereto. The bearing pin 3 is a solid of revolution symmetric in the axis 5, and is directed downwardly and inwardly toward the axis of rotation of the entire bit. The bearing pin includes as bearing surfaces the roller race 9, ball race 6, side surface 23 of the pilot pin 4, and finally the end surface 18. In prior art bits, the annular surface or shoulder 13 surrounding the base of the pilot pin is not used as a bearing surface.

The cutter 1 rotatably mounted on the bearing pin has the general form of a conical shell with cutting members 11 secured in sockets extending from its outer surface, members 11 here being interferingly mounted inserts or compacts of sintered tungsten carbide. When mounted as shown in the drawing figure, the bearing cavity of cone 1 includes a progression of surfaces in axial registry with those of the bearing pin 3, specifically roller race 10 registering with race 9 and support the circumferential row of rollers 12, ball race 7 facing ball race 6 of the bearing pin and supporting the circumferential row of balls 8, and annular face 14 confronting the like surface 13 of the bearing pin. At the nose end of the cone interior there are two pressed-in members selected and treated for their particular ability to withstand wear in this critical area, namely the thrust button 17 and the nose bushing 16. Thrust button 17 is mounted in its indicated socket to protrude therefrom and bear against the end surface 18 of the pilot pin 4, while the interior cylindrical surface 24 of bushing 16 bears against the corresponding surface 23 of the pilot pin and transmits radial loads thereto.

At the large diameter of base end of bearing pin 3, its juncture with bit leg 2 is contoured to define part of the gap accommodating a seal ring 26, the balance of the gap being formed by the indicated counterbore in the backface of the cone. The seal 26 illustrated in the figure is of the Belleville spring type, although any suitable seal ring may be employed.

While considering the prior art rolling cutter assembly of FIG. 1, note should be taken of the axial gap 15 between the confronting, nonbearing surfaces 13 and 14. On the other hand, the balls 8 fit into their raceways 6 and 7 with virtually no loose space except the clearance normally used in bearing manufacture. The small diagonal channels connecting the ball races with the roller races and the nose end of the assembly serve as lubricant flow channels.

When the bit is being used to make hole, balls 8 share the outward thrust load, as indicated by arrow 20, with thrust button 17 and pilot pin 4. They also share the radial loading with rollers 12 and nose bushing 24. That portion of the bearing pin ball race 6 indicated at 27 undergoes continual stress reversal, particularly on the pressure side of the assembly, where the radial reaction force 28 exerted by the rock being drilled on the cone is felt. As each ball rolls over this area or portion 27 of the ball race 6, it exerts a highly concentrated force on the race, followed thereafter by a relief of such force until the next ball arrives at the same spot and exerts its concentrated force thereon.

The results of such prior art bearing configuration are illustrated in FIGS. 2 and 3, which both show an enlargement of the ball bearing portion of the assembly of FIG. 1 after a considerable period of operation under conditions such that the net axial thrust load is outward, tending to push the rolling cutter in the direction of the arrow 20. Such thrust is transmitted to ball 8 from inboard portion 29 of the cutter race 7, and from ball 8 to outboard portion 27 of the bearing pin race 6. Progressive wear in both these areas (especially 27) causes the cone to shift outwardly on the bearing pin, as indicated by the gap 30 between ball 8 and cone race 7, until ultimately the gap 15 between surrfaces 13 and 14 disappears or all but disappears, as illustrated in FIG. 2. By the time the ball races 6 and 7 have worn to the extent indicated, portions 27 and 29 may have experienced several million cycles of stress reversal, and such stress reversals may well result in spalling of fatigue failure in these areas, particularly in the bearing pin ball race (the cone ball race being less likely to be so affected because the fatigue loading is spread over a full 360°, whereas in the bearing pin ball race it is distributed over a much smaller circumferential portion, perhaps 120° or less roughly centered on its pressure side). Such spalling of the ball race contaminates the entire bearing with metal particles.

FIG. 3 shows the same condition as FIG. 2, but with the rolling cutter being pushed away from the cone under the influence of an inward thrust force, as indicated by the arrow 22. This condition is likely to prevail if it is necessary to use the bit for reaming out an undersized hole to full gage, and when the bit is being pulled from the hole or simply held off bottom. Since the balls are the only members that can prevent the cone from slipping off of its bearing pin, they must absorb this inward thrust. In this posture of the cone the gap 15 reappears, possibly enlarged. The gap resulting from wear of race 6 shifts to the position 30', between balls 8 and the worn portion 27 of the bearing pin ball race.

FIG. 4 illustrates a new rolling cutter assembly, similar to that of FIG. 1 but incorporating the improvements of the present invention. In this first preferred embodiment the cone ball race 7 has not been changed, but the registering raceway 76 in the periphery of the bearing pin 73 has been modified by undercutting to define an outboard gap or groove 70 between race 76 and balls 8. This groove is preferably formed by cutting the entire raceway 76 from an outwardly displaced center with a radius somewhat larger than that of the balls and of the corresponding prior art raceway, preferably making the inboard extremity of the race approximately tangent to the balls 8 at their inboard extremities, as shown in FIG. 4. (The reference position of the cone 71 is that in which its annular face 84 is in frictional contact with the corresponding annular face 83 of the bearing pin, see below. Of course, the position of the cone determines the illustrated position of the balls in the new bit assembly.) This technique also provides a radial clearance between the balls and raceway, and has the additional effect of relieving the ball bearing from the task of transmitting radial loads. However, since the wall defining the undercut or gap 70 is designed never to be contacted by balls 8 or any other members, its outboard portion may have any configuration desired, e.g., the square contour indicated in phantom at 78 (and the same is true of the undercut grooves illustrated in all of the other embodiments described below).

To insure that bits embodying the present invention may be utilized for reaming as well as cutting full hole, it is preferred that the bearing structure also include a change in the fit of the annular surfaces 83 and 84. Whereas prior art bits are designed so that the new assembly has a gap between such surfaces, in the FIG. 4 assembly these surfaces fit against each other from the start so that outward thrust loads are transmitted from thrust face 84 of the cone to thrust face 83 of the bearing pin, insuring that until the bit is worn out the balls 8 will not be required to take any outward thrust. The nose bushing 16, which is interferingly fitted in the nose part of the cone and rotates with it, is preferably dimensioned so that it does not bear against the thrust face 83 of the bearing pin, as indicated by the gap 77. Nose bushing 16 is intended primarily for radial loading, and it is not necessary that it also be employed as a thrust member.

FIG. 5 shows the improved rolling cutter assembly of FIG. 4 after many hours of drilling service, during which essentially all of the thrust loading was in the outward direction. The balls and ball races have experienced no wear whatsoever, as they have not been required to serve as load transmitting members, either in the radial loading direction or in the axial direction. All of the outward thrust has been borne by the thrust face 83 and the pilot pin (not shown) of bearing pin 73. Of course, there is also wear on the cone thrust face 84, the combined wear being indicated in FIG. 6 by the axial dimension W. This amount of wear permits the cone to be thrust outwardly the same distance, but such movement is nevertheless insufficient to completely close the gap 70. As shown in the figure, gap 70 has been reduced in size to something less than half of its original axial dimension, causing a gap 75 to open between the balls and the lower half of ball race 76.

FIG. 6 shows the same rolling cutter assembly as in FIGS. 4 and 5, and in the same wear condition as shown in FIG. 5. The difference lies in the fact that cone 71 is experiencing a net inward thrust, in the direction indicated by arrow 22, causing it to move forward relative to the bearing pin and carrying the balls 8 with it. In this position any inward thrust is transmitted from the cone ball race 7 to balls 8 to the contacted inward portion of bearing pin ball race 76, and of course this same contact locks the cone on the bearing pin. So long as this inward thrust is small in size, e.g., when the bit is simply being held off bottom without doing any reaming, there will be no wear on the portions of the ball races contacted by the balls, as shown in FIG. 6. It will be apparent that the only differences between the new assembly of FIG. 4 and the same assembly after a period of use as shown in FIG. 6 is the appearance of a wear gap 85 between thrust flanges 83 and 84. In this figure the dashed line 88 represents the original (new bit) interface of thrust faces 83 and 84, and shows that each of them has experienced some wear.

While the improvements of the present invention may be applied with good results to prior art rolling cutter assemblies using roller bearings to transmit radial loads, whether sealed and lubricated or not, it is preferred that such rollers be replaced with journal bearings. A journal bearing assembly is illustrated in FIGS. 4–6, one having confronting cylindrical surfaces 79 and 80. This strengthens the assembly by eliminating the need for roller raceways in the bearing pin and cone, making both of these members thicker and stronger. The journal bearing illustrated in FIGS. 4–6 may use a wear resistant inlay 81 in bearing pin 73, and an inlay 82 in bearing surface 80 of the rolling cone 71. The assembly is preferably sealed with a resilient, annular packing ring 86 seated in the indicated counterbore in the backface of rolling cone 71. The annular surface 87 adjacent such counterbore is ordinarily spaced from the adjacent parallel surface of the bit leg 72, as shown, but such space may purposely be closed up so that this pair of transverse surfaces serve as a means for transmitting outward axial thrust.

While the preferred new assembly disposition of relieved ball races 7 and 76 relative to thrust faces 83 and 84 has been described above as that shown in FIG. 4, it should be noted that another disposition is possible. A bit could be made and assembled as shown in FIG. 5 so that the thrust faces contact one another, when pushing the cone outwardly on the bearing pin, and at the same time the ball races 7 and 76 are disposed coaxially with each other, both or one of them also being undercut to receive balls 8 with the complete semicircular gap shown in FIG. 5. An alternate construction would be replacing the closely fitting balls of a prior art bit (e.g., FIG. 1) with a set of slightly smaller balls. It will be apparent that in each such assembly the cone 71 (or 1) will shift to the FIG. 6 (FIG. 3) position as soon as the net axial force is changed to the inward direction, and for this reason the assembly may be entirely unsuitable for reaming a borehold. However, there may be special occasions when this disadvantage is of little or no consequence, as when only full hole drilling is in sight.

FIG. 7 shows a new assembly having essentially the same journal bearing assembly as FIGS. 4–6, differing only in that the undercut 90 is supplied to the inward portion of the cone ball race 97. As in other embodiments of the invention, in the new assembly of FIG. 7 the annular thrust face 104 of cone 91 is in frictional contact with the corresponding thrust face 103 of bearing pin 93, so that from the outset outward thrust is transmitted from cone to bearing pin at the thrust faces. After a considerable period of operation under outward thrust conditions, wear of the thrust faces will cause cone 91 to move upwardly relative to both the bearing pin 93 and balls 8, causing the axial dimension gap 90 to be reduced somewhat and opening a gap between the balls and the outboard portion of cone ball race 97. When conditions are changed so that the net axial force on cone 91 is inward, balls 8 are clamped between the outboard portion of cone ball race 97 and the inboard portion of bearing pin ball race 6 to prevent the cone from being moved off of the bearing pin. At such time, a gap will appear between the thrust faces 103 and 104. The axial dimension of this gap is, of course, accounted for by the wear of these two surfaces.

FIG. 8 illustrates a third embodiment utilizing the improvements of the present invention, one in which bearing pin ball race 96 has been undercut to provide the gap 95 and the rolling cutter ball race 97 has been undercut to provide gap 90. The assembly is illustrated in its newly manufactured condition, with thrust face 104 of rolling cutter 91 in frictional contact with the corresponding thrust face 103 of bearing pin 93'. In this condition the balls 8 served as a locking member, preventing the cutter from sliding off its bearing pin by virtue of their being squeezed between the outboard extremity of cutter ball race 97 and the inboard extremity of bearing pin ball race 96. It will be appreciated that this embodiment is a combination of those illustrated in FIGS. 4 and 7, and that the dimensions of the gaps 90 and 95 may be somewhat reduced from those illustrated to provide only the relief necessary to prevent balls 8 from transmitting any outward thrust load and any radial loads.

The fourth preferred embodiment illustrated in FIG. 9 provides ball race relief which is largely effective against only outward thrust loading. The relief shown is concentrated in rolling cutter 91', although of course the bearing pin could also be relieved, either in the same manner as the cutter race 98 or in the manner illustrated in any of the previously described enbodiments. To obtain the type of undercut 100 illustrated, the simplest procedure is to form the inboard half of race 98 by displacing the radius of such half inwardly and forming such half with a radius somewhat greater than its outboard half (and somewhat larger than the radius of balls 8). The inboard half of race 98 is also made tangent to the balls 8 at their radially outward extremities, thus leaving the outboard half of race 98 essentially equal in radius to that of the bearing pin ball race 6 and only slightly greater than that of balls 8 themselves. In this manner an undercut 100 is formed in only the inboard half of cutter ball race 98, such undercut or gap 100 increasing from a minimum at the radially outward extremity of the race and increasing to a maximum at its inboard extremity. However, as in other embodiments, this inboard half of the race may be provided with various other configurations, e.g., the square configuration 99 illustrated in the drawing.

FIG. 10 is an isometric view of a bearing pin 73 similar to that shown in the assembly of FIG. 4. It will be noted that the ball raceway 76 and its undercut portion 70 show no spalling, despite the fact that the particular bearing pin illustrated was used for drilling for 108 hours.

The analogous prior art bit 73' is shown in FIG. 11. This bearing pin is essentially identical with that shown in FIG. 10, except that bearing pin 73' lacks the undercut of the FIG. 10 ball race 76. The ball race 76' of the prior art is badly spalled at the areas 89, such spalling being sufficient to pull considerable metal from the raceway in the form of fine metal chips which thereafter became mixed with the lubricant and migrated to various other parts of the composite bearing. In such areas, the fine particles cause considerable scratching and gouging of the surfaces and bring the life of the overall bearing to an early termination. Such an unhappy result may also be produced by metal particles becoming embedded in the seal ring.

In all of the embodiments discussed above, it is believed to be apparent that the ball race relief necessary to prevent fatigue and spalling of the bearing pin raceway may be obtained by undercutting one or both ball raceways, in particular the outboard portion of the bearing pin raceway and the inboard half of the rolling cutter raceway. Of course, when both races are relieved the amount of each relief can be less than the amount necessary when only one race is relieved.

Such relief would be of no utility, of course, unless other parts of the bearing structure are provided with the contact relationship needed for transmitting outward thrust from the rolling cutter to its bearing pin. While the illustrated embodiments utilize two pairs of contacting surfaces for this surface, thrust button on pilot pin and the annular thrust faces on the shoulder adjacent the pilot pin, under some conditions only one of these contacts may be necessary. In addition, other design modifications may be made to provide various pairs of transversely extending friction contact surfaces to partially or wholly transmit the outward thrust. It is within the scope of the invention to utilize all combinations of such thrust surfaces, and not only those specifically illustrated and described. It is also within the scope of the invention to utilize all forms and dispositions of ball race undercutting in one or both ball races which provide the simultaneous relationships in a new cutter assembly: (1) the thrust faces are in frictional contact with each other, and (2) there is a gap between the balls and either or both the outboard portion of the bearing pinball race and the inboard portion of the cutter ball race, such gap or gaps preventing the transmission of outward thrust through the balls and preferably extending around the race to furnish a radial gap to prevent the transmission of radial loads. In such a bit the balls and ball raceways must also be sized and disposed so that the balls contact portions of both raceways to lock the cone on the bearing pin; while this relationship preferably obtains simultaneously with the other two conditions, in some assemblies it may obtain only when the thrust faces are out of contact with one another.

What is claimed is:

1. In a rock drill wherein a rolling cutter is rotatably mounted on a cantilever bearing pin with the interposition of a set of balls disposed in a pair of registering circumferential races to lock the cutter on the bearing pin, and there is at least one pair of transversely extending and adjoining surfaces on the cutter and bearing pin, one each of the races and one each of the transverse surfaces on the exterior surface of the bearing pin while the other member of each pair is disposed on the interior surface of the rolling cutter, the improvement wherein said races and pair of surfaces are formed and disposed: (1) with said pair of transverse surfaces in frictional contact with one another, and (2) with *a portion of* at least one of the races spaced from the balls to prevent said balls from carrying outward thrust [.] *and the remaining portion substantially tangent said balls in order to resist substantial inward movement from inward thrust.*

2. The improved rock drill of claim 1 in which said races are formed and disposed so that the outboard portion of the bearing pinball race is spaced from the balls by a gap which extends from the outboard extremity of the race to its radially innermost portion, thereby preventing the balls from bearing radial loads as well as outward thrust.

3. The improved rock drill of claim 1 in which said races are formed and disposed so that the inboard portion of the rolling cutter ball race is spaced from the balls by a gap which extends from the inboard extremity of the race to its radially outermost portion, thereby preventing the balls from bearing radial loads as well as outward thrust.

4. The improved rock drill of claim 1 in which said races are formed and disposed so that both the outboard portion of the bearing pinball race and the inboard portion of the rolling cutter ball race are spaced from the balls by gaps.

5. The improved rock drill of claim 1 in which said races are formed and disposed so that both the outboard portion of the bearing pinball race and the inboard portion of the rolling cutter ball race are spaced from the balls by gaps extending from said portion to the deepest part of the race, thereby preventing the balls from bearing radial loads as well as outward thrust.

6. The improved rock drill of claim 1 in which the balls are gripped between the inboard portion of the bearing pin race and the outboard portion of the rolling cutter race to lock the cutter on the pin when said pair of transverse surfaces are in frictional contact with one another.

7. In a rock bit which includes at least one bearing pin member and a rolling cutter member mounted on such bearing pin to rotate with respect thereto, the bearing structure between said bearing pin and cutter including at least one thrust friction bearing defined by opposed transverse faces on the two members and a ball bearing consisting of a set of balls rolling in a toroidal raceway jointly defined by the two members, the improvement comprising selectively deepened portions in the toroidal raceway proportioned relative to the thrust bearing so that when the opposed faces of the thrust bearing come into thrust-transmitting contact with each other there is no load-transmitting contact through said balls other than the inward thrust transmitting contact which also locks the cutter to the bearing pin.

8. In a rock bit having at least one bearing pin depending cantilever fashion below the body of the bit and extending toward the axis of rotation of the bit, a rolling cutter or cone in the general form of a conical shell rotatably mounted on such bearing pin and locked thereon against inadvertent removal in a direction parallel to the axis of the bearing pin by a set of balls disposed in a pair of registering circumferential raceways, one on the outer surface of the bearing pin and the other on the inner surface of the rolling cone, there being a bearing structure between the rolling cone and the bearing pin which includes said balls and raceways and at least one friction bearing comprising a pair of transversely extending, confronting surfaces, one on each of the cone and pin, the improvement comprising portions of said ball raceways being undercut so that said rolling cone has a first or new position relative to the bearing pin in which said confronting surfaces are in outward thrust-transmitting contact and there are clearances *in the undercut portions* between said balls and the ball raceways, *and contact between said balls and the ball raceways in the remaining portions*, thus relieving the ball bearing of at least outward thrust loading, *but transmitting inward thrust loading through said ball bearing*, and a second or partially worn position in which there is a clearance between the confronting surfaces of the friction bearing and inward thrust-transmitting contact between cone, balls and bearing pin.

9. A journal bearing type rolling cutter assembly of a rock disintegrating drilling tool including a downwardly extending leg, a stub shaft projecting generally perpendicular to a surface of said leg, a rolling cutter secured on the stub shaft to rotate about the axis thereof, and an antifriction bearing between said cutter and stub shaft in the form of a circumferential row of balls disposed in a pair of registering toroidal raceways on the exterior of the shaft and the interior of the cutter, the radial and axial thrust bearings of said assembly otherwise comprising registering pairs of confronting surfaces on the two members, at least *a portion of* one of said ball raceways being selectively undercut so that axial thrust in the direction from the stub shaft to the leg is transmitted through one or more of said pairs of confronting surfaces and not through said balls and ball raceways [.] *with the remaining portion of said undercut raceway contacting said balls to transmit axial thrust in the direction from the leg to the stub shaft.*

10. In the bearing of a rolling cone assembly which includes at least one pair of frictionally engaged axial thrust-transmitting surfaces on a bearing pin and a rolling cone and a circumferential row of balls disposed in a pair of mating raceways on said bearing pin and cone, said balls serving to lock the members together during operation, the improvement comprising *a portion of* said ball raceways being selectively deepened so that outward thrust is transmitted only through said thrust surfaces, *and the remaining portion of each raceway mating with the balls to transmit inward thrust*, whereby said ball raceway on the bearing pin is relieved of loading and spalling of the raceway is reduced to prolong the life of the bearing.

11. In the bearing of a rolling cutter rotatably mounted on a bearing pin, a pair of friction bearing surfaces one on the cutter and the other on the bearing pin and extending transversely of the axis of rotation of the cutter, said surfaces being in contact with each other to transmit outward thrust loading from the cutter to the bearing pin, and a ball bearing comprising a multiplicity of balls disposed in a registering pair of circumferential raceways on said bearing pin and cutter, one or both raceways being undercut so that the distance between the outward portion of the bearing pin raceway and the inward portion of the cutter raceway is larger than the ball diameter whereby the *outward* thrust loading is taken only by the friction bearing surfaces.

12. A lubricated and sealed rock bit cutter assembly comprising a stub shaft extending integrally from a leg of the bit and a rolling cone cutter surrounding and rotatably mounted on said stub shaft, the mounting of said cutter on the stub shaft being a composite bearing consisting of a circumferential ball bearing and friction bearings, said friction bearings including at least one journal bearing for radial loading and at least one pair of transversely extending thrust faces, such thrust faces being disposed one on each member and in registering and contacting relationship, said ball bearing comprising a multiplicity of balls disposed in a pair of generally registering and generally semicylindrical races on the two members, said races having dimensions and dispositions to lock the cutter on the shaft in the contacting position of said thrust faces by squeezing the balls between the outboard portion of the cutter race and the inboard portion of the shaft race, the other portions of at least one of said races being spaced from said balls so that outward thrust on the cutter is transmitted to the shaft only through said thrust faces.

13. An improved bearing structure in a rolling cone rock bit, said bearing structure comprising an outboard journal bearing, an inboard thrust friction bearing defined by a pair of transversely extending surfaces, one on the rolling cutter and one on the bearing pin on which the cutter is rotatably mounted, and a circumferentially disposed ball bearing between said journal bearing and said thrust bearing, said ball bearing comprising a multiplicity of balls disposed in a toroidal raceway jointly defined by a race in the interior surface of the rolling cone and a similar race on the exterior surface of the bearing pin, such races being disposed so that in a newly manufactured assembly (1) the balls are squeezed between the outboard portion of the cone ball race and the inboard portion of the bearing pin ball race, (2) said pair of transversely extending surfaces are in frictional contact, and (3) other portions of at least one of said races define gaps with said balls to prevent said ball bearing from transmitting outward thrust and radial loads.

14. In a rolling cutter assembly consisting of a conical shell cutter rotatably mounted on a fixed bearing pin having a base portion and a pilot pin portion terminating with a free end, there being an annular shoulder on the end of said base portion surrounding its juncture with said pilot pin, the cutter having a bearing cavity conforming generally to the shape of the bearing pin which includes a transverse surface adjoining the annular surface of the bearing pin, said cutter being locked on the bearing pin against movement in the inboard direction, toward the free end of the bearing pin, by a set of balls disposed in a toroidal raceway jointly defined by a pair of generally registering circumferential races on the two members, the balls contacting both the inboard portion of the bearing pin ball race and the outboard portion of the cutter ball race to accomplish such locking, the improvement comprising disposing said races and undercutting nonlocking portions of at least one of them so that said transverse surface of the cutter bears against the annular shoulder of the bearing pin to transmit outward thrust therethrough and at the same time the raceway space accommodating the set of balls has cross-sectional dimensions in at least the outward thrust direction greater than the diameter of the balls, thereby relieving the balls of at least outward thrust.

15. The improved rolling cutter assembly of claim 14 in which said undercutting provides a raceway space having a cross section larger than the diameter of the balls in both the radial direction and the outward thrust direction, thus relieving the ball bearing of radial loads as well as outward thrust.

* * * * *

Disclaimer and Dedication

Reissue No. 28,625.—*Robert A. Cunningham*, Bellaire, Tex. ROCK DRILL WITH INCREASED BEARING LIFE. Patent dated Nov. 25, 1975. Disclaimer and dedication filed Dec. 3, 1976, by the assignee, *Hughes Tool Company*.

Hereby disclaims and dedicates claims 1–15 of said patent.

[*Official Gazette February 1, 1977.*]